United States Patent [19]

St. Laurent, Jr.

[11] 4,244,589
[45] Jan. 13, 1981

[54] SEALED SHAFT OF REDUCED DIAMETER

[75] Inventor: Wilfred H. St. Laurent, Jr., Marblehead, Mass.

[73] Assignee: Bellofram Corporation, Burlington, Mass.

[21] Appl. No.: 90,367

[22] Filed: Nov. 1, 1979

Related U.S. Application Data

[62] Division of Ser. No. 3,163, Jan. 15, 1979, Pat. No. 4,208,060.

[51] Int. Cl.$^3$ .............................. F16J 3/04; F16J 15/56
[52] U.S. Cl. .............................. 277/30; 277/212 FB; 74/18
[58] Field of Search ......... 277/30, 95, 212 R, 212 FB; 74/18, 18.1, 18.2

[56] References Cited

U.S. PATENT DOCUMENTS

| | | | |
|---|---|---|---|
| 1,151,227 | 8/1915 | Stokes | 277/212 R X |
| 1,712,003 | 5/1929 | Hubbard | 277/212 R X |
| 3,582,091 | 6/1971 | Smith | 277/30 X |
| 4,132,422 | 1/1979 | Sankey et al. | 277/212 FB |

FOREIGN PATENT DOCUMENTS

| | | |
|---|---|---|
| 2333432 | 1/1974 | Fed. Rep. of Germany .... 277/212 FB |
| 2362764 | 7/1974 | Fed. Rep. of Germany .... 277/212 FB |

Primary Examiner—Robert S. Ward, Jr.
Attorney, Agent, or Firm—Erwin Salzer

[57] ABSTRACT

A shaft sealing precluding fluid from moving in a direction longitudinally of the shaft. At the same time the shaft sealing allows a motion of the shaft in axial direction, an inclination of the shaft, and may also allow a rotary motion of the shaft relative to its sealing means. The sealing means is a rolling diaphragm including a clamping flange on one end of the rolling wall thereof. There is a difference of pressure to either side of the rolling wall of the diaphragm. Its shaft has a predetermined outer diameter, and its radially inward directed bottom has a central bore therein equal to the predetermined outer diameter of the shaft. A tubular member having an inner diameter equal to the outer diameter of the shaft is mounted on the shaft. That tubular member has an outer diameter of such thickness as to engage a length of the rolling wall of the rolling diaphragm. The aforementioned tubular member has an end surface in permanent engagement with the bottom of the rolling diaphragm with a cylindrical elastomeric member having a projection conforming substantially with the shape of a portion of reduced diameter of the shaft and engaging under pressure said portion of reduced diameter.

4 Claims, 3 Drawing Figures

SEALED SHAFT OF REDUCED DIAMETER

This is a division, of application Ser. No. 3,163, filed Jan. 15, 1979, U.S. Pat. No. 4,208,060.

BACKGROUND OF THE INVENTION

This invention provides a shaft seal which is less complex and less expensive than prior art shaft seals.

SUMMARY OF THE INVENTION

A sealed shaft according to the present invention includes a shaft having a predetermined diameter and a rolling diaphragm having a rolling wall and attachment means to either end of said rolling wall. The attachment means of the rolling diaphragm include a radially outer clamping flange and a radially inward directed bottom having a central bore therein equal to said predetermined diameter of said shaft. The rolling diaphragm is made of an elastomeric substance and includes an intermediate rolling wall between said radially outer clamping flange and said inward directed bottom. A tubular member having an inner diameter equal to the outer diameter of said shaft is mounted on said shaft and has a radially outer diameter of such thickness as to engage a length of said rolling wall of said rolling diaphragm. Said tubular member has an end surface in permanent engagment with, i.e. abutting against, said bottom of said rolling diaphragm. Considering a higher pressure to prevail on the concave or bottom side, than on the convex or top side, of the rolling diaphragm, the higher pressure will act to clamp the diaphragm tightly against said shaft and said tubular member and thus seal the space above the rolling diaphragm from the space below the latter.

Preferably the thickness of the radially inward directed bottom of said rolling diaphragm should exceed the thickness of the rolling wall thereof.

DESCRIPTION OF PREFERRED EMBODIMENTS

Figure 1:
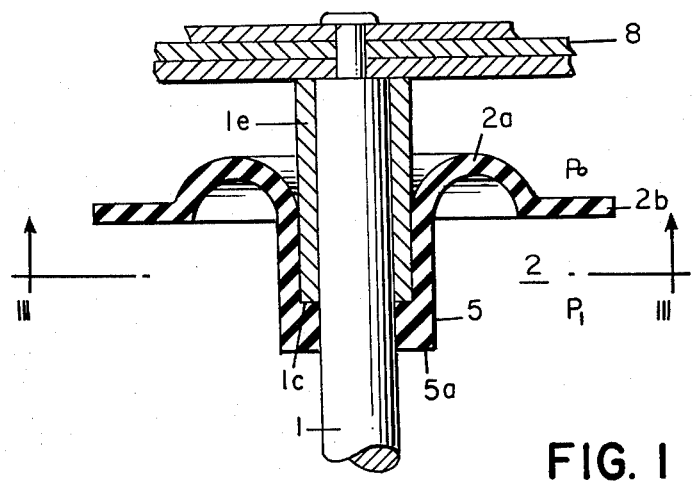
FIG. 1 shows a longitudinal section of a preferred embodiment of the invention.

Referring now to the drawings, numeral 1 has been applied to indicate a shaft which may be rotatable or non-rotatable. As shown in FIG. 1, shaft 1 has a predetermined diameter. Numeral 2 has been applied to generally designate a rolling diaphragm including a rolling wall 2a and means for attaching both ends of said rolling wall. One of said attachment means, namely that for the radially outer end of its rolling wall 2a, includes a clamping flange 2b. The other attachment means, namely that for the radially inner end of rolling diaphragm 2, includes a substantially cylindrical member 5 of an elastomeric material arranged in coaxial relation to shaft 1 and surrounding shaft 1. As shown in FIG. 1, member 5 has an annular projection 5a conforming diameter the shape of the portion of reduced diameter 1a of portion of reduced diameter and engaging said portion of reduced diameter. This gives rise to strong forces in radially inward direction causing rolling diaphragm 2 to adhere to shaft 1.

Figure 3:
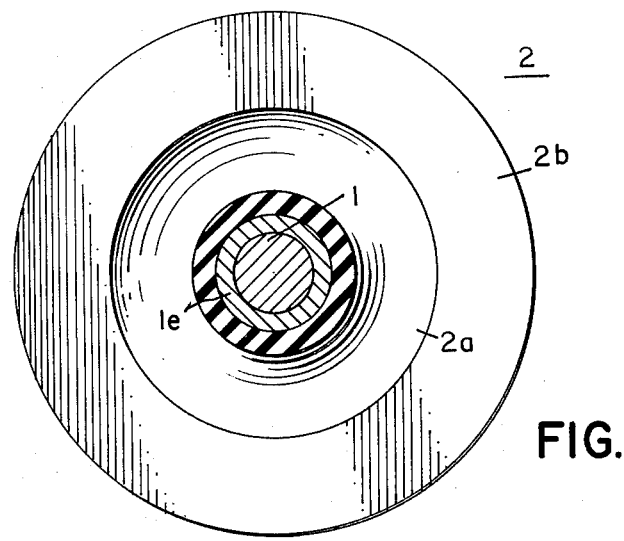
FIG. 3 shows a section along III—III of FIG. 1.

It will be apparent from FIGS. 1 and 3 that shaft 1 is allowed by rolling diaphragm to move forewardly and rearwardly in axial direction. Rolling diaphragm 1 allows also small inclinations of shaft 1. If the elastic member 5 exerts relatively little pressure upon shaft 1 member 5 forms a bearing for shaft 1 allowing a relative rotary motion between shaft 1 and elastomeric member 5.

Elastomeric member 5 and rolling diaphragm 2 including its rolling wall 2a and its radially outer clamping flange 2b may consist of a unitary piece of an elastomeric material.

Figure 2:
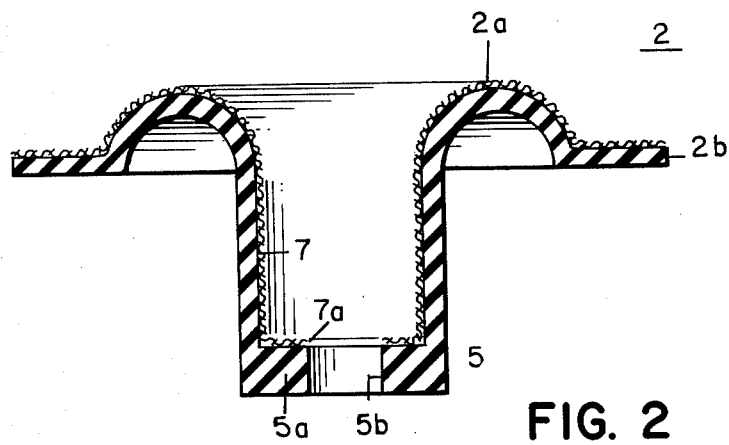
FIG. 2 shows a longitudinal section of a modification of the rolling diaphragm of FIG. 1.

According to FIG. 2 rolling diaphragm 2 includes, in addition to the elastomeric ply, a fabric reinforcement 7. Fabric reinforcement 7 ends at point 7a, i.e. it does not extend to the surface 5b of elastomeric member 5. In other words, fabric reinforcement 7 is trimmed out at the region thereof coextensive with the surface of shaft 1. This imparts an creased flexibility to the axially outer end 5a of elastomeric member 5 and thus avoids wicking, i.e. formation of a leakage path.

As shown in FIG. 1, the shaft 1 projects from a space $P_1$ wherein a relatively high pressure prevails into a space $P_o$ wherein a relatively low pressure or vacuum prevails. Reference numeral 1e has been applied to indicate a tubular member surrounding shaft 1 and having an inner diameter equal to the outer diameter of shaft 1. The part or portion 1e of larger diameter than the torque-transmitting portion of shaft 1 has a planar end surface 1c in abutting engagement with the axially inner end surface of portion 5a of cylindrical elastomeric member 5 of rolling diaphragm 2. The part or portion 1e of shaft 1 may be of metal. The top of shaft 1 supports other parts to which reference numeral 8 has been applied. The nature of these parts has no bearing on the present invention. Since in the embodiment shown part 1e is sandwiched between parts 5a and 8, part 1e does not need any additional means for affixing it to shaft 1. Where the tubular portion 1e is not firmly positioned relative to shaft 1, it must be affixed by fasteners to shaft 1. The pressure $P_1 > P_o$ keeps the portion 5a of diaphragm 2 tightly against part 1e surrounding shaft 1.

I claim as my invention:

1. A sealed shaft for the passage from one space into another space where a different pressure prevails comprising in combination
    (a) a shaft having a predetermined outer diameter;
    (b) an elastomeric rolling diaphragm having a radially outer clamping flange, an intermediate convoluted rolling wall, and a radially inward directed bottom having a central bore therein equal to said predetermined outer diameter of said shaft; and
    (c) a tubular member having an inner diameter equal to the outer diameter of said shaft mounted on said shaft, said tubular member having a radially outer diameter of such thickness as to engage a length of said rolling wall of said rolling diaphragm; and
    (d) said tubular member having an end surface in permanent engagement with said bottom of said rolling diaphragm.

2. A sealed shaft as specified in claim 1 wherein the thickness of said radially inward directed bottom of said rolling diaphragm exceeds the thickness of said rolling wall thereof.

3. A sealed shaft as specified in claim 1 wherein said tubular member is affixed to said shaft.

4. A sealed shaft as specified in claim 1 wherein said rolling diaphragm comprises a fabric reinforcement in addition to an elastomeric ply, and wherein said fabric reinforcement is trimmed out at the region of engagement of said bore and said shaft in said bottom of said rolling diaphragm.

* * * * *